(12) United States Patent
Kang et al.

(10) Patent No.: US 10,169,854 B2
(45) Date of Patent: Jan. 1, 2019

(54) LIQUID CRYSTAL DISPLAY DEVICE HAVING MEASURING MARK FOR MEASURING SEAL LINE, APPARATUS AND METHOD OF MEASURING SEAL LINE

(71) Applicant: LG Display Co., Ltd., Seoul (KR)

(72) Inventors: DongChun Kang, Gyeonggi-do (KR); JungBum Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 10 days.

(21) Appl. No.: 14/849,828

(22) Filed: Sep. 10, 2015

(65) Prior Publication Data

US 2016/0133004 A1 May 12, 2016

(30) Foreign Application Priority Data

Nov. 12, 2014 (KR) .......................... 10-2014-0157392

(51) Int. Cl.
| | | |
|---|---|---|
| *G02F 1/1339* | (2006.01) | |
| *G06T 7/00* | (2017.01) | |
| *G02F 1/13* | (2006.01) | |
| *G06T 7/70* | (2017.01) | |
| *G02F 1/1333* | (2006.01) | |

(52) U.S. Cl.
CPC .......... *G06T 7/0004* (2013.01); *G02F 1/1309* (2013.01); *G02F 1/1339* (2013.01); *G06T 7/70* (2017.01); *G02F 2001/133354* (2013.01); *G02F 2001/133388* (2013.01); *G06T 2207/30121* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 7,271,094 B2 | 9/2007 | Jung et al. | |
| 7,679,709 B2 | 3/2010 | Lin et al. | |
| 9,196,205 B2 | 11/2015 | Yokonuma et al. | |
| 2004/0090589 A1 | 5/2004 | Jung et al. | |
| 2005/0126679 A1 | 6/2005 | Kim et al. | |
| 2007/0263161 A1 | 11/2007 | Lin et al. | |
| 2009/0268145 A1* | 10/2009 | Anjo ................. | G02F 1/134363 349/141 |

(Continued)

FOREIGN PATENT DOCUMENTS

| | | |
|---|---|---|
| CN | 1501146 A | 6/2004 |
| CN | 101428509 A | 5/2009 |

(Continued)

OTHER PUBLICATIONS

Extended European Search Report dated Dec. 23, 2015, for corresponding European Patent Application No. 15186890.8.

(Continued)

*Primary Examiner* — Richard H Kim
(74) *Attorney, Agent, or Firm* — Morgan, Lewis & Bockius LLP (57) ABSTRACT

The present invention disposes a plurality of measuring marks on a dummy region having a seal line to detect a position and a width of the seal line during a fabrication process of a liquid crystal display device and then process can be terminated without further processes in case of bad quality of the seal line, thereby process delay and cost may be minimized.

14 Claims, 5 Drawing Sheets

(56) References Cited

U.S. PATENT DOCUMENTS

| | | | | |
|---|---|---|---|---|
| 2011/0090445 A1* | 4/2011 | Kim | ..................... | G02F 1/1339 |
| | | | | 349/139 |
| 2014/0176895 A1* | 6/2014 | Park | ..................... | G02F 1/1339 |
| | | | | 349/153 |
| 2014/0340600 A1 | 11/2014 | Yokonuma et al. | | |
| 2015/0103298 A1* | 4/2015 | Lee | .................. | G02F 1/133351 |
| | | | | 349/123 |

FOREIGN PATENT DOCUMENTS

| JP | 20000066221 A | 3/2000 |
|---|---|---|
| JP | 20070147673 A | 6/2007 |
| KR | 20090055404 A | 6/2009 |
| TW | I335458 B | 1/2011 |
| WO | 2013047363 A1 | 4/2013 |

OTHER PUBLICATIONS

Office Action, dated Apr. 3, 2018, in the counterpart Chinese patent application No. 201510632747.3.

* cited by examiner

LIQUID CRYSTAL DISPLAY DEVICE HAVING MEASURING MARK FOR MEASURING SEAL LINE, APPARATUS AND METHOD OF MEASURING SEAL LINE

CROSS-REFERENCE TO RELATED APPLICATION

Pursuant to 35 U.S.C. § 119(a), this application claims the benefit of earlier filing date and right of priority to Korean Application No. 10-2014-0157392, filed on Nov. 12, 2014, the contents of which is incorporated by reference herein in its entirety.

BACKGROUND OF THE INVENTION

1. Field of the Invention

This invention relates to a liquid crystal display device, and more particularly an inspection apparatus and a measuring method of seal line of the liquid crystal display device having a metal pattern on a dummy region thereof to detect the seal line by a human eyes.

2. Background of the Invention

In general, the liquid crystal display device may be used to a large size display device of a television as well as a small size display device of mobile electronics because of the light weight, the low power consumption, and the high resolution characteristics.

The liquid crystal display device includes a lower substrate having thin film transistors and pixel electrodes thereon, a upper substrate having Red, Green, and Blue-color filters thereon, and a liquid crystal layer between the attached lower and upper substrates. When the liquid crystal display device is fabricated by attaching two substrates for each other, a driving signal (that is, gate signal) and a data signal are applied to a display region to generate a electric field in the liquid crystal layer and then liquid crystal molecules of the liquid crystal layer are aligned in the predetermined direction by the electric field to control the transmittance of the light from a backlight, thereby images are display in the liquid crystal display device.

Figure 1:
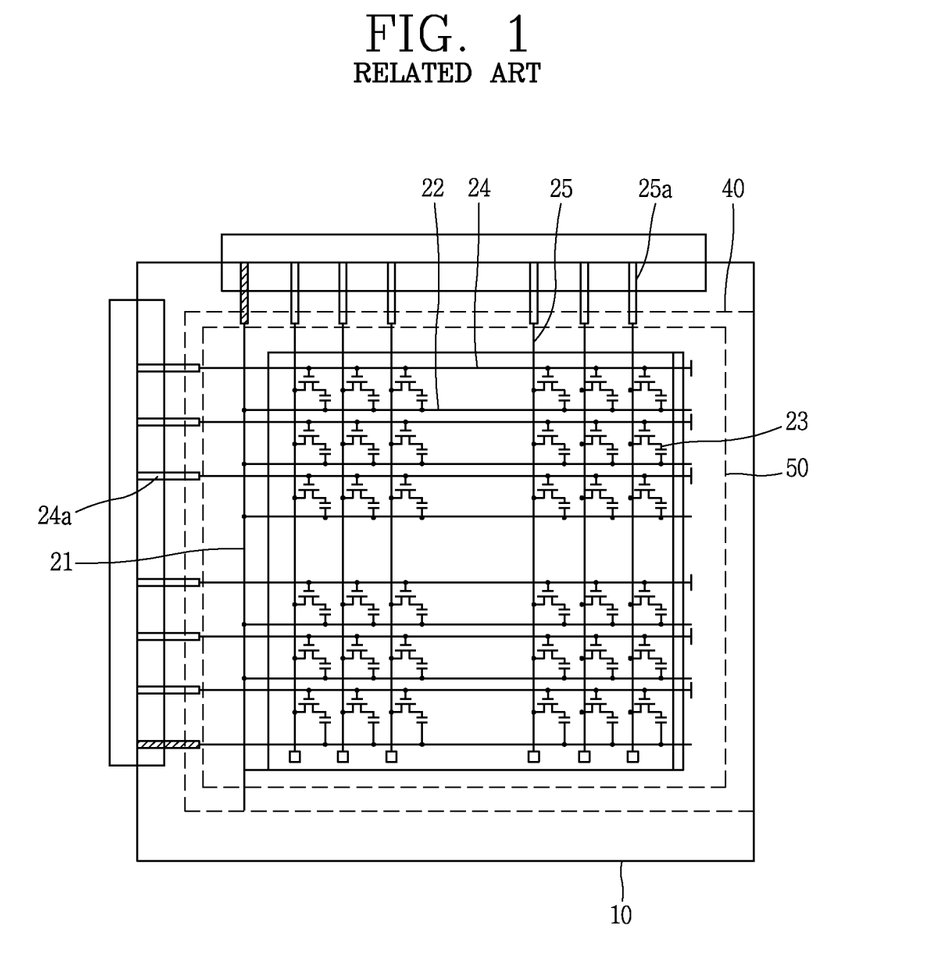
FIG. 1 is a plane view illustrating a structure of a related liquid crystal display device.

FIG. 1 is a plane view schematically illustrating the structure of the related liquid crystal display device.

As shown in FIG. 1, the related liquid crystal display device includes a first substrate 10, a second substrate 40, and a liquid crystal layer disposed between the first substrate 10 and the second substrate 40.

On the first substrate 10 which is the lower substrate, a plurality of gate lines 24 and data lines 25 are perpendicularly disposed to define a plurality of pixel regions in which a pixel electrode 23 and a common electrode are disposed. At the each of cross portions of the gate lines 24 and the data lines 25, a thin film transistor is disposed as a switching device. Further, one end portion of the gate line 24 and the data line 25 are respectively connected to a gate pad 24a and a data pad 25a so that the driving signal and the data signal is applied to the gate line 24 and the data line 25 from a printed circuit board.

The second substrate 40 is the upper substrate. No shown in figure, a color filter layer and a black matrix are disposed on the second substrate so that the color image is displayed and the light passing through the non-image display region may be blocked to prevent the image deterioration. Since the area of the second substrate 40 is smaller than that of the first substrate 10, a dummy region of the first substrate 10 is exposed by extending from the second substrate 40. On the exposed dummy region of the first substrate 10, the gate pad 24a, the data pad 25a, and a connection line which connects respectively the gate pad 24a and the data pad 25a to the gate line 24 and the data line 25 are disposed.

The first substrate 10 and the second substrate 40 are attached for each other by a seal line 50. Here, the seal line 50 are formed along the edge area of the first substrate 10 or the second substrate 40 by depositing sealant thereto, then the first and second substrates 10 and 40 having the seal line 50 are pressed and the seal line 50 is hardened, thereby the first and second substrates 10 and 40 are attached for each other.

However, there are some problems in the related liquid crystal display device as follow.

In general, the sealant is deposited by a screen printing method, a slit coating method, and a syringe coating method to form the seal line 50. Here, the seal line 50 is formed in the dummy region of the liquid crystal display device. When the seal line 50 is extended to the display region, however, the liquid crystal layer in the display region is contacted with the seal ling 50 so that the liquid crystal molecules are contaminated. This contaminated liquid crystal molecules causes the mis-alignment of the liquid crystal molecules at the driving mode of the liquid crystal display device, so that the light transmittance through the liquid crystal layer cannot be controlled and then the image may be deteriorated.

Therefore, the seal line 50 should be disposed at the dummy region, not the display region. In order to achieve this, the seal line 50 should be formed at the predetermined position in the predetermined width. Further, the seal line 50 should be precisely measured in order to form the seal line at the predetermined position in the predetermined width. However, in the related liquid crystal display device, since the width of the seal line 50 cannot be measured during the liquid crystal display device fabricating process, the width of the seal line 50 can be merely estimated based on depositing amount of the sealant from a screen printer, a slit coater, or a syringe during the fabricating process. In order to measure the width of the seal line 50, the seal line 50 should be observed by the human eyes after completion of the fabrication process.

Therefore, since the width of the seal line 50 cannot be measured in real time during the fabrication process, the next fabricating processes should be progressed in case where the width of the seal line 50 is not the predetermined width and then the fabricated substrate may be defective. As a result, it was consumed by the cost and time by the next fabricating processes.

In addition, when the seal line 50 is inspected after the termination of the fabricating processes of the liquid crystal display device, it is impossible to measure precisely the width and position of the seal line 50 since the seal line 50 is inspected by the operator's eyes. In order to solve this problem, the operator is able to measure the width and position of the seal line 50 with a microscope. However, in this case, the operator has to inspect the fabricated liquid crystal display device one by one with the microscope, so that the fabricating process may be delayed by the time consumption.

SUMMARY OF THE INVENTION

Accordingly, the present invention is directed to a liquid crystal display device that substantially obviates one or more of the problems due to limitations and disadvantages of the related art.

Accordingly, an object of the present invention is to provide an apparatus and a method of detecting and measuring a position and a width of a seal line of a liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended claims.

To achieve these and other advantages and in accordance with the purpose of the present invention, as embodied and broadly described, a liquid crystal display device comprises a first substrate and a second substrate including a display region and a dummy region at the outer portion of the display region, a seal line in the dummy region of the first and second substrates, and a plurality of measuring marks overlapped with at least a part of the seal line in the dummy region. By the plurality of measuring marks, in this embodiment, it is possible to measure in real time during the fabrication process whether the seal line is disposed at the precise predetermined position and the distance from the predetermined position when the seal line is not disposed at the predetermined position.

The plurality of measuring marks may be disposed along the width direction of the seal line at regular distance interval.

The plurality of measuring marks includes two position measuring marks to judge whether the seal line is disposed at the precise predetermined position and the distance between two position measuring marks may be correspond to width of the seal line.

By numbering the plurality of measuring marks between the one end portion of the seal line and the position measuring mark near the end portion of the seal line of two position measuring marks, the distance of the seal line from the predetermined position can be measured.

The width of the measuring mark may be approximately 3.0-4.0 µm.

The interval distance between the neighboring measuring marks may be approximately 4.5-5.5 µm.

The measuring marks may be disposed near the side end portions of the seal line.

The measuring mark may be a metal pattern, an insulating pattern, or a semiconductor pattern.

In another aspect, a seal line inspection apparatus comprises a camera for photographing the measuring marks and the seal line in the dummy region of the liquid crystal display device and a controlling unit for detecting the position and width of the seal line by analyzing an image information photographed by the camera.

The controlling unit includes an image analysis unit for analyze the image from the camera to generate position information of the seal line and the measuring marks, a position detecting unit for detecting the position of the seal line based on the position information of the seal line analyzed by the image analysis unit, and a width measuring unit for measuring the width of the seal line based on the position information of the seal line analyzed by the image analysis unit.

The controlling unit further includes a comparing unit for comparing the measured position and width of the seal line with the predetermined position and width and a judging unit for judging the bad quality of the seal line based on the comparing result by the comparing unit.

In another aspect, a measuring method of the seal line of the liquid crystal display device comprises providing the liquid crystal display device including the display region and the dummy region having the seal line and the plurality of measuring marks therein, obtaining images of the seal line and the measuring marks by the camera, detecting the position of the seal line based on the information of the seal line and the measuring marks by analyzing the images, and detecting the width of the seal line based on information of the seal line and the measuring marks.

The measuring the position of the seal line includes analyzing the obtained images to detect the position of the seal line and position measuring marks and numbering the measuring marks between the seal line and the position measuring mark to detect the position of the seal line.

The detecting the width of the seal line includes numbering the measuring marks overlapped with the seal line.

The seal line measuring method further comprise comparing the detected position and width of the seal line with predetermined position and width to judge the bad quality of the seal line.

The method of depositing sealant on a substrate according to one embedment of the invention comprises detecting a position and a width of the sealant in real time of a substrate fabricating process using a measuring means at a outer area of a display region of the substrate and an inspecting device for detecting the measuring means without estimation based on depositing amount of sealant.

The measuring means includes the plurality of measuring marks along the width direction of the sealant in the regular distance interval and the method of detecting a position and a width of the sealant includes observing an overlap portion of the sealant and the measuring marks.

The inspecting device includes a camera for obtaining image information of the sealant and the measuring marks and a controlling unit for analyzing image information of the sealant and the measuring marks and then detecting the position and the width of the sealant in real time using the analyzed result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE INVENTION

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the exemplar embodiments set forth herein. Rather, these embodiments are provided so that this disclosure will be thorough and complete and will fully convey the scope of the inventive concept to those skilled in the art, and the present inventive concept will only be defined by the appended claims.

The shapes, dimensions, proportions, angles, figures, numbers, etc disclosed in the drawings to describe the embodiments of the present invention are merely examples and the present invention is not limited thereto. Like reference numerals designate like elements throughout the specification. In descriptions of the invention, when it is deemed that detailed descriptions of related well-known technology may unnecessarily obscure the gist of the invention, detailed description thereof will be omitted. The terms 'include', 'comprise', 'have', and 'consist of' are intended to mean that the parts may include additional sub-parts unless the term "only" is stated. As used herein, the terms "a," "an," and "the" are to be understood as meaning both singular and plural, unless explicitly stated otherwise.

Although not explicitly stated, the elements may be interpreted with a margin of error.

When the position relation between two parts is described using the terms 'on', 'above', 'below', 'next', and the like, one or more parts may be positioned between the two parts as long as the term 'immediately' or 'directly' is not used.

In case of the description of the time relationship, when the time sequence is described using the terms 'on', 'after', 'subsequently', 'next', 'before' and the like, non-continuation situation may be included in the invention as long as the term 'immediately' or 'directly' is not used.

While terms such as 'first', 'second', etc. may be used to describe various components, such components must not be understood as being limited to the above terms. The above terms are used only to distinguish one component from another. For example, a first component may be referred to as a second component without departing from the scope of rights of the present invention.

The components of various embodiments of the present invention can be partially or entirely bonded to or combined with each other and can be interlocked and operated in technically various ways as can be fully understood by an ordinary person skilled in the art, and the embodiments can be carried out independently of or in association with each other.

Hereinafter, the present invention will be described in detail with reference to the accompanying drawings.

Figure 2:
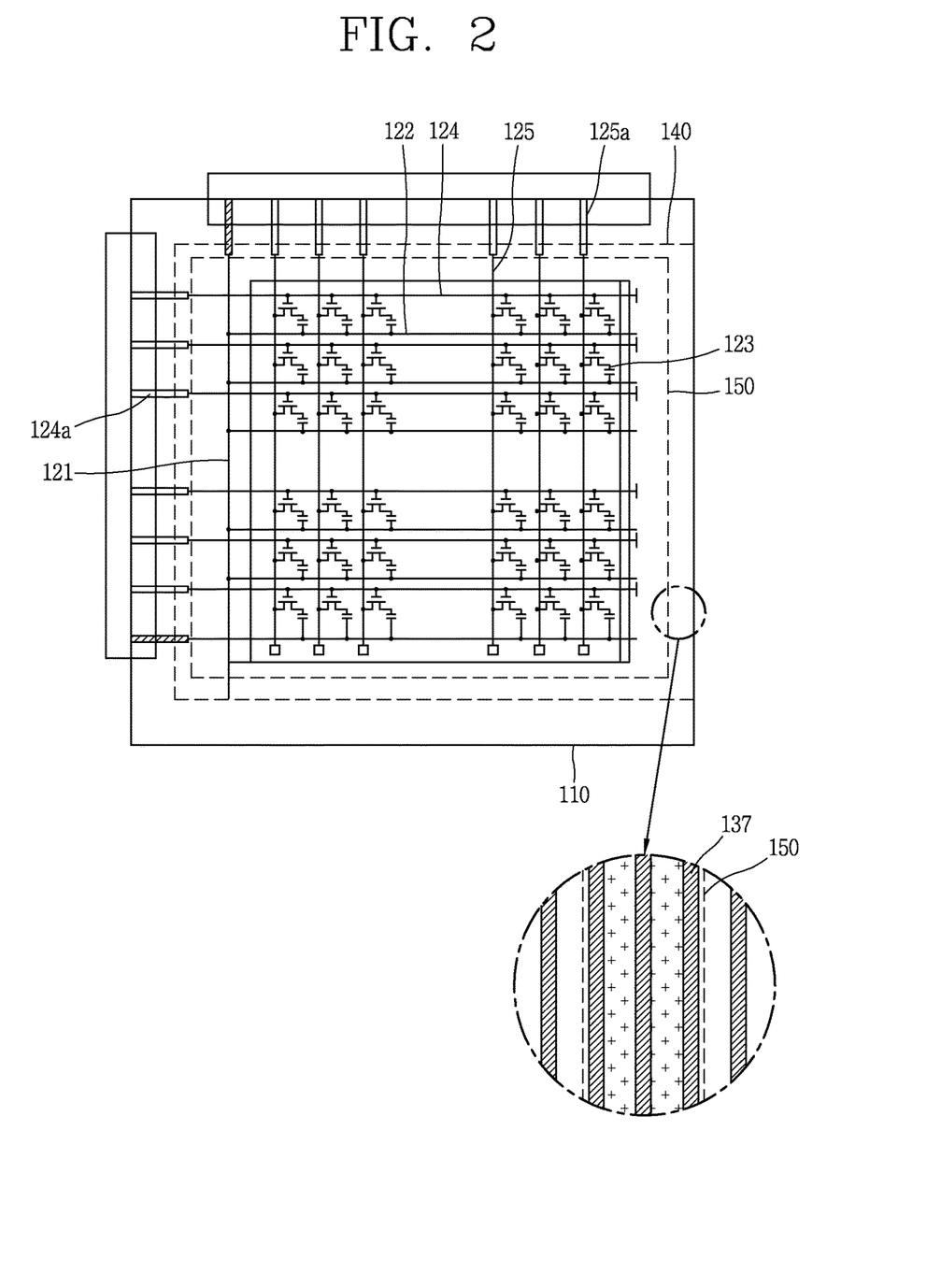
FIG. 2 is a plane view schematically illustrating the structure of the liquid crystal display device according to an example embodiment of the present invention.

FIG. 2 is a plane view illustrating the structure of the liquid crystal display device in accordance with an example embodiment of the present invention.

As shown in FIG. 2, the liquid crystal display device of example embodiments of the present invention may include a first substrate 110, a second substrate 140, and a liquid crystal layer between the first substrate 110 and the second substrate 140.

A plurality of gate lines 124 and data lines 125 are vertically disposed for each other to define a plurality of pixel regions, and pixel electrode 123 and common electrode (not shown in figure) are disposed in each of the pixel regions. At the cross region of the gate lines 124 and the data lines 125, a thin film transistor, a switching device, is disposed. Gate pads 124a and data pads 125a are respectively connected to one end portions of the gate lines 124 and the data lines 125 to apply a driving signal and a scan signal from a printed circuit board to the gate lines 124 and the data lines 125.

Not shown in figure, a color filter and a black matrix are disposed over the second substrate so that a color is display by the color filter and the deterioration of the image quality is prevented by blocking the light leaked through a non-image displaying area by the black matrix.

A seal line 150 is disposed in an outer area of at least one substrate of the first substrate 110 and the second substrate 140 to attach the first substrate 110 and the second substrate 140 for each other. A liquid crystal layer is disposed between the first substrate 110 or the second substrate 140.

At this time, since the area of the first substrate 110 is larger than that of the second substrate 140, a part area of the first substrate 110 is not attached with the second substrate 140 and then the non-attached area is exposed when the first substrate 110 and the second substrate 140 are attached for each other. The exposed area of the first substrate 110 can be formed along one side or two sides thereof.

The liquid crystal display device includes a display region and a non-display region (i.e., a dummy region). The display region is the region where the liquid crystal layer is sealed by the seal line 150 to display the image. The gate lines 124, the data lines, the TFTs, and the color filter are disposed in the display region. The dummy region (or a part of the non-display region), in which the image is not displayed, at the outer portion of the display region includes the exposed area of the first substrate 110 and the seal line disposed area.

The gate pads 124a, the data pads, and a plurality of connection line for connecting respectively the gate pads 124a and the data pads 125a to the gate lines 124 and the data line 125 are disposed in the dummy region.

Further, in the dummy region, a plurality of measuring marks 137 for measuring the width of the seal line 150 are disposed. Where the term 'measuring mark' means a vision indicator formed on the substrate for the purpose of measure and verification to the object. Various terms can be used instead of 'measuring mark'. The plurality of measuring marks 137 are disposed along the width direction of the seal line 150 in the predetermined width at the dummy region. The measuring marks 137 are overlapped with the seal line 150. Where the term 'overlap' means that at least a part of two lower and upper objects are filed up with other object or no object sandwiched therebetween. Various terms can be used instead of 'overlap'.

The plurality of measuring marks 137 are disposed at the dummy region and formed in the strip shape having the predetermined width in the width direction of the dummy region and extending to the length direction of the dummy region. Further, each of the measuring marks 137 have the same width of the neighboring measuring mark 137 and the measuring marks 137 are disposed in the same distance interval. Therefore, the distance between the neighboring measuring marks 137 is constant so that the distance between the plurality of measuring marks 137 can be precisely measured. When the width of the measuring mark 137 is 3.5 μm and the distance between the neighboring measure marks 137 is 5 μm, for instance, the distance between the continuous three measuring marks 137 is 13.5 μm and the distance between the continuous four measuring marks 137 is 22 μm.

The measuring marks 173 are overlapped with at least a part area of the seal line 150. For instance, the measuring mark 173 can be disposed in the strip shape to surround totally the display region at the dummy region. In this case, the measuring marks 137 are overlapped with the whole area of the seal line 150. The measuring marks 137 may be disposed in a part portion of the dummy region so that the measuring marks 137 are overlapped with only a part area of the seal line 150. For instance, the measuring marks 137 may be disposed at the position where the seal line 150 is easily observable by the operator or easily photographed by a camera installed to a seal line inspection device. The measuring marks 137 can be disposed at the various positions according to structure, size, and model of the liquid crystal display device.

In example embodiments of the present invention, the width of the seal line 150 may be measured by a distance measuring method using the measuring masks 137. As shown in FIG. 2, since the seal line 150 is overlapped with the measuring marks 137, the position and the width of the seal line 150 can be measured by detecting the overlapped measuring marks 137.

Hereinafter, we will describe example embodiments of the present invention in detail with the accompanying FIG. 3 which is a sectional view of the liquid crystal display device illustrated in FIG. 2. Although the liquid crystal display device includes the display region having a plurality of pixel regions to display the image and the dummy region, which is disposed at the outer portion of the display region, having the various signal path patterns and the sealing, only one pixel region and dummy region are shown in figure for the convenience of the description.

Figure 3:
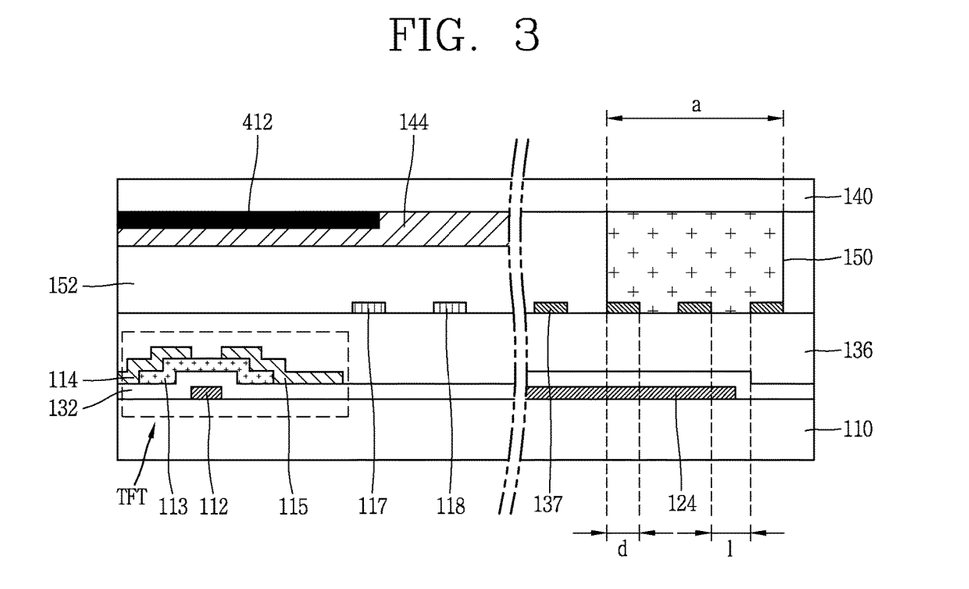
FIG. 3 is a sectional view of the liquid crystal display device according to an example embodiment of the present invention.

As shown in FIG. 3, the TFT is disposed over the first substrate 110. The TFT includes a gate electrode 112 disposed on the first substrate to be supplied the scan signal from the gate line, a gate insulating layer 132 deposited over the whole area of the first substrate 110 having the gate electrode 112, a semiconductor layer 132 on the gate insulating layer 132, and a source electrode 114 and a drain electrode on the semiconductor layer 113.

The gate electrode 112 is formed by depositing and etching the metal layer made of the metal selected from a group consisting of Cr, Mo, Ta, Cu, Al, and Al alloy and the gate insulating layer 132 is formed in a signal layer made of an inorganic material such as $SiO_2$ or $SiNx$ or double layers made of $SiO_2$ and $SiNx$. The gate electrode 112 and the gate line is integrally formed so that the scan signal is applied to the gate electrode 112 through the gate line.

The semiconductor layer 113 can be formed by depositing and etching an amorphous semiconductor material such as amorphous silicon or a polycrystalline semiconductor material such as polycrystalline silicon. The source electrode 114 and the drain electrode 115 can be formed by depositing and etching the metal selected from the group consisting of Cr, Mo, Ta, Ti, Al, and Al alloy. The source electrode 114 and the data line are integrally formed so that the image signal is applied to the source electrode 114 through the data line.

At the dummy region over the first substrate 110, further, a plurality of gate link lines 124 and a plurality of gate pads are disposed. The gate link line 124 connects the gate pad to the gate line to apply the scan signal to the gate line from the outer device. At that time, the gate link lines 124 and the gate pads are made of the same metal as the gate electrode 112 with the same process. However, the gate link lines 124 and the gate pads can be made of the different metal from the gate electrode 112 by the different process.

Not shown in figure, the data link lines may be disposed in the dummy region of the first substrate 110. Where the data link lines may be disposed on the first substrate 110 or on the gate insulating layer 132. In case where the data link lines are disposed on the first substrate 110, the data link lines are formed by the same metal as the gate electrode 112. In case where the data link lines are disposed on the gate insulating layer 132, the data link lines are formed by the same metal as the source electrode 114 and the drain electrode 115.

The data link lines are electrically connected to the data pads and the data lines to apply the image signal to the data lines.

A passivation layer 135 is deposited over the whole area of the first substrate 110 to cover the TFTs. The passivation layer 136 is made of an organic insulating layer such as photo acryl so that the passivation layer 136 acts as planarization layer having the predetermined thickness.

Further, the passivation layer 136 may be formed in the double layers including the organic layer and an inorganic layer. At this structure, the inorganic layer is disposed under the organic layer to improve the interfacial property between the passivation layer 136 and the gate insulating layer 132.

In the display region on the passivation layer 136, a plurality of pixel electrodes 117 and common electrodes 118 are alternately disposed. The pixel electrode 117 and the common electrode 118 are formed in the strip shape having the predetermined width and disposed parallel for each other, so that the electric field substantially parallel to the surface of the substrate 110 is generated by applying the signal to the pixel electrode 117.

The pixel electrode 117 and the common electrode 118 may be formed of the high conductive metal. Further, the pixel electrode 117 and the common electrode 118 may be formed of a transparent metal oxide such as a ITO (Indium Tin Oxide) and IZO (Indium Zinc Oxide). In case where the pixel electrode 117 and the common electrode 118 are formed by the transparent metal oxide, the brightness of the liquid crystal display device can be improved comparing to the pixel electrode 117 and the common electrode 118 made of an opaque metal.

The measuring marks 137 are disposed on the passivation layer 136 in the dummy region. The measuring marks 137 may be made of the various material. Since the measuring marks 137 are observed by the operator's eye or the camera, any material can be used as the measuring marks 137 if the measuring marks 137 may be identified by the operator's eye or the camera. For instance, a metallic pattern, an organic pattern, and a semiconductor pattern, etc., are used as the measuring marks 137.

As shown in figure, the plurality of measuring marks 137 of the strip shape having the predetermined width (d) are disposed in the dummy region along the extension direction of the side of the liquid crystal display device. These measuring marks 137 are disposed at regular distance interval (I). In example embodiments, the width (d) of each of the measuring marks 137 may be 3.0-4.0 μm, preferably 3.5 μm, and the distance interval (I) between the neighboring measuring marks 137 may be 4.5-5.5 μm, preferably 5 μm.

However, the measuring marks 137 can be formed in the various width (d) and distance interval (I) and the number of the measuring marks 137 is dependent upon the width (d) and the interval (I) thereof.

The seal line 150 is disposed on the passivation layer in the dummy region on the first substrate 110 to attach the first substrate 110 and the second substrate 140 for each other and the liquid crystal layer 152 is sandwiched and sealed between the first substrate 110 and the second substrate 140. The seal line 150 is formed by depositing a sealant on the first substrate 110 to attach the second substrate 140 to the first substrate 110 and depositing the sealant on the second substrate 140 to attach the first substrate 110 to the second substrate 140.

The seal line 150 is overlapped with the plurality of the measuring marks 137 and the width of the seal line 150 is smaller than the total width of the measuring marks 137 (i.e., the width of the region where the measuring marks 137 are disposed). Thus, the seal line 150 is disposed within the measuring mark-arrange area so that the seal line 150 is overlapped with a part of total measuring marks 137.

The black matrix 142 and the color filter layer 144 are disposed on the second substrate 140. The black matrix 142 is formed with the opaque material such as metal, e.g. Cr and CrOx and a black resin to block the light leaked through an non-image display area of the display region. The color filter layer 144 includes R (Red), G (Green), and B (Blue)-color elements to display the color image.

The seal line 150 and the plurality of measuring marks 137 may be overlapped for each other. In general, there are some problems in case where the seal line 150 is not form in the predetermined width (d). For instance, when the width (d) of the seal line 150 is smaller than the predetermined width, the attaching force and the encapsulating force are decreased so that the attached first and second substrates is poor and the liquid crystal material sealed by seal line 150 may be leaked.

When the width (d) of the seal line 150 is larger than the predetermined width, the seal line 150 may be contacted with the liquid crystal layer 152 in the display region because of the extension of the seal line and this causes the contamination of the liquid crystal material. As a result, there is the problem of the drive of the liquid crystal molecules when the liquid crystal molecules are driven by the signal.

In the related art, however, t the position and the width of the seal line 150 cannot be measured during the fabrication process of the liquid crystal display device, so that the inferiority of the seal line 150 is merely detected by the detecting device such as a microscope after the fabrication process of the liquid crystal display device is terminated.

However, the position and the width of the seal line 150 may be measured by the measuring marks 137 in real time during the fabrication process, so that the inferiority of the liquid crystal display device can be prevented.

Since the measuring marks 137 having the predetermined width (d) and the distance interval (I) may be disposed in the dummy region and the transparent sealant is deposited to cover the measuring marks 137, the relative position of the measuring marks 137 can be observed during the fabrication process so that the width (d) and the distance interval (I) of the seal lines (15) can be detected.

For instance, when the seal line 150 is formed in the width (a) of 1 mm and the measuring marks 137 are formed in the width (d) and the distance interval (I) of 3.5 μm and 5 μm respectively, a pitch of the measuring marks 137 is 8.5 μm. Therefore, the seal line 150 is overlapped with 117 measuring marks 137 and then the operator detects the number of these overlapped measuring marks 137 to measure precisely the width of the seal line 150.

Figure 4:
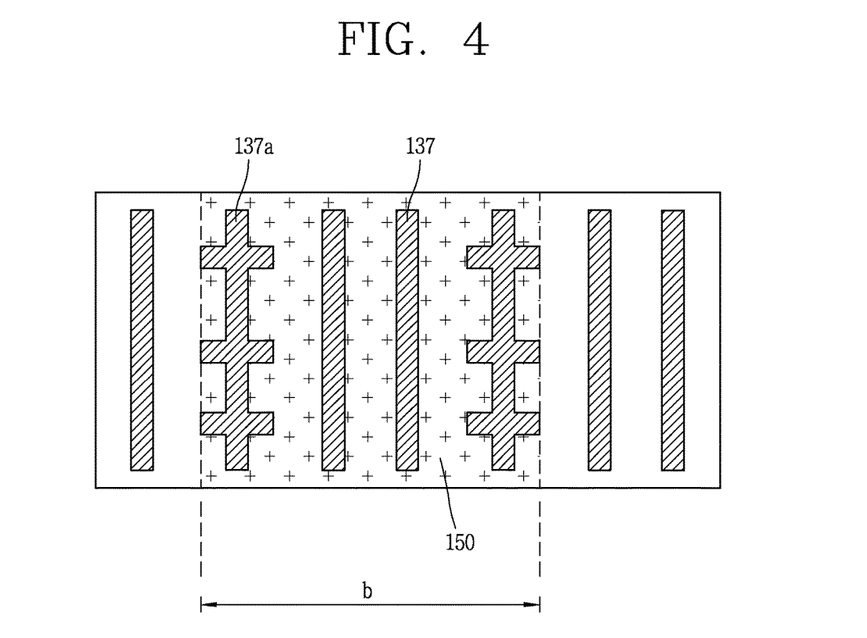
FIG. 4 is a view illustrating a plurality of measuring marks and a seal line in a dummy region of the liquid crystal display device.

Further, the position of the seal line 150 can precisely be measured. As shown in FIG. 4, the measuring marks 137 of this invention may be formed in the different shapes, not the same shape. For example, only the particular measuring marks 137 can be formed in the different shapes. For instance, as shown in figure, some measuring marks 137 is formed in the strip shape and other two position measuring marks 137a is formed in the strip shape having protrusions in the both sides area.

Referring to FIG. 4, the distance (b) between the two position measuring marks 137a is same as the width (a) of seal line 150. That is, the portion between two position measuring marks 137a is the area where the seal line is disposed. Thus, the operator or a tester observes the two position measuring marks 137a and the deposited seal line 150 during the fabrication process of the seal line 150 to judge whether the seal line 150 is disposed in the area between two position measuring marks 137a to detect the inferiority of the seal line 150.

When the seal line 150 is not disposed at the predetermined position, the number of the measuring marks 137 between the both side ends of the seal line 150 and the position measuring mark 137a is detected so that the distance between the seal line 150 and the position measuring mark 137a (that is, distance between the seal line 150 and the predetermined position) can be easily detected in real time.

Figure 5:
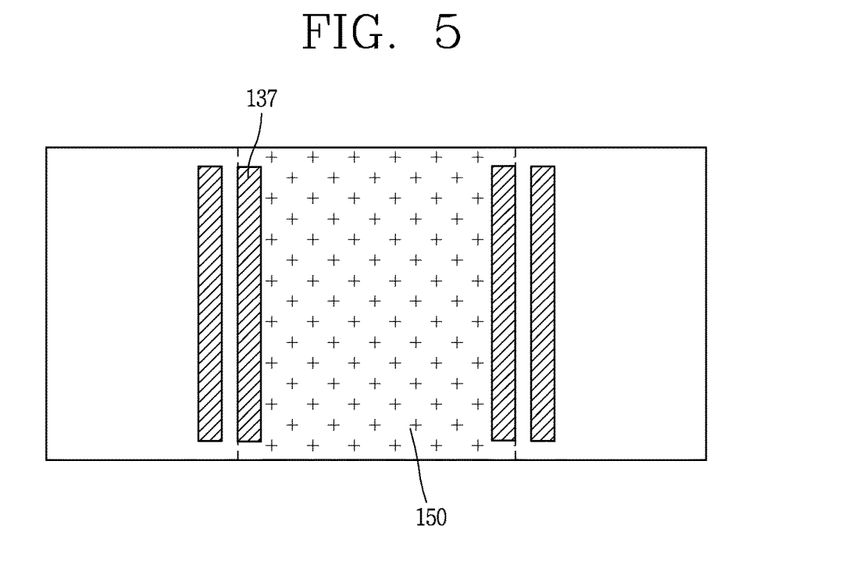
FIG. 5 a view illustrating other structure of the of measuring marks and the seal line in a dummy region of the liquid crystal display device.

FIG. 5 is a view illustrating the different structure of the measuring mark 137 of the liquid crystal display device according to an example embodiment of the present invention. In this structure, the measuring marks 137 is only disposed at the area near the both side ends of the seal line 150, not disposed at the whole area of the dummy region.

In the process of the seal line 150, the deviation degree of the seal line 150 from the predetermined position by an error is relatively smaller than the width of the seal line 150. In other word, when the error of the seal line 150 is occurred, the deviation of the seal line 150 from the predetermined position is small.

Accordingly, since the error of the seal line 150 is measured at the area of the both side ends of the seal line 150, it is possible to measure the position and the width of the seal line (150) by deposing the measuring marks 137 at the area near the both side ends of the seal line 150, not the whole area of the dummy region.

Although two measuring marks 137 are at the area near each of the both side ends of the seal line 150 in FIG. 5, more than three of the measure marks 137 may be disposed. The number of the measuring marks 137 at the area near the both side ends of the seal line 150 is dependent upon practical error data, etc.

In this embodiment, the measuring marks 137 are only disposed at the area near the both side ends of the seal line 150, it is not necessary to dispose the measuring marks 137 at the central area of the dummy region which corresponds to the central area of the seal line 150. As described above, since the width of the seal line 150 is much larger than the pitch of the measuring marks 137, many of the measuring marks 137 should be formed in the dummy region if the measuring marks 137 are disposed through the whole area of the seal line 150.

However, in case where the many of the measuring marks are disposed, for instance, since a photo mask having a complex pattern should be used to form the metal pattern for the measuring mark 137, the cost of the liquid crystal display device may be increased and the structure of the dummy region may be complicated. On the contrary, in this embodiment, the measuring marks 137 are disposed only at the area near the both side ends of the seal line 150 so that the cost can be decreased and the structure of the dummy region can be simplified.

As described above the plurality of the measuring marks 137 may be disposed in the dummy region of the liquid crystal display device so that the position and the width of the seal line 150 can be easily detected in real time. These position and width of the seal line 150 can be detected by eye of the operator. Further, the position and width of the seal line 150 can be automatically detected by a seal line inspection apparatus in real time.

In the automatic inspection of the seal line 150 by the seal line inspection apparatus, the seal line 150 is photographed by camera during the fabrication process and then a controlling unit detects the width and the position of the seal line 150 base on the data obtained by the camera. Hereinafter, this detection process will be described in detail.

Figure 6:
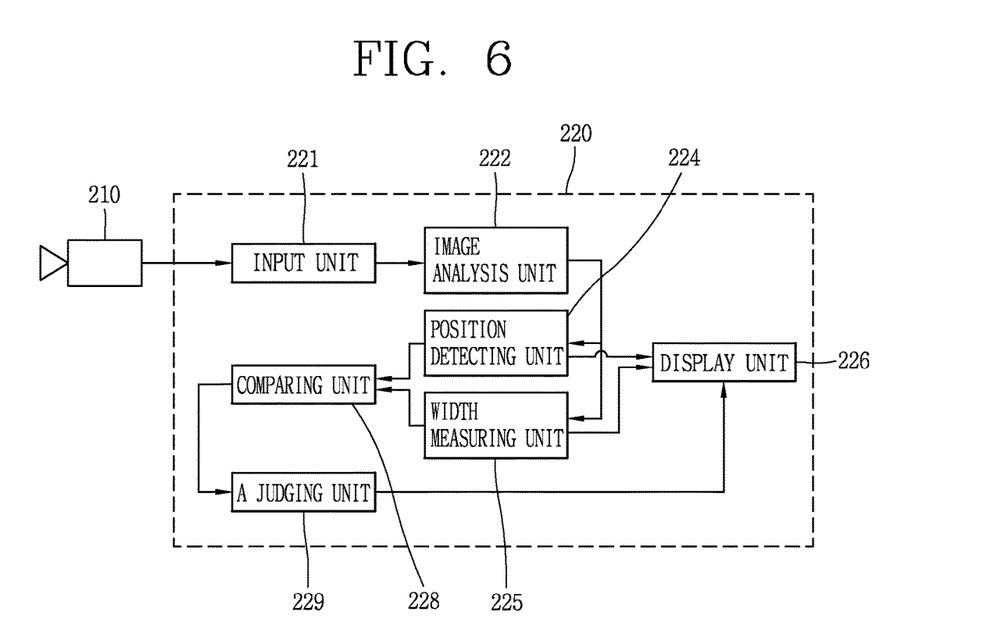
FIG. 6 is a block diagram illustrating the structure of a seal line inspecting apparatus according to an example embodiment of the present invention.

FIG. 6 is a block diagram illustrating the structure of the seal line inspection apparatus in accordance with an example embodiment of the present invention.

As shown in FIG. 6, the seal line inspection apparatus may include the camera 210 for photographing the seal line 150 and the measuring marks 137 in the dummy region of the liquid crystal display device and the controlling unit 220 for analyzing the image obtained by the camera and comparing the analysis data of the obtained image with the position of the seal line 150 and the measuring marks 137 to detect the position and the width of the seal line 150.

A CCD (Charge Coupled Device) camera may be used as the camera 210. The camera 210 is installed vertically above the seal line 150 and the measuring marks 137 or obliquely above the seal line 150 and the measuring marks 137 in the predetermined angle to photograph the seal line 150 and the measuring marks 137.

The controlling unit 220 includes an input unit 221, an image analysis unit 222, a position detecting unit 224, a width measuring unit 225, a comparing unit 228, a judging unit 229, and a display unit 226.

The image obtained by the camera 210 is inputted to the input unit 221. In the image analysis unit 222, the images of the seal line 150 and the measuring marks 137 through the input unit 221 are analyzed to generate position information for the seal line 150 and the measuring marks 137.

The position detecting unit 224 detects the position of the seal line 150 by comparing the position information of the seal line 150 with the position information of the measuring marks 137.

The width measuring unit 225 measures the width of the seal line 150 by comparing the position information of the seal line 150 with the position information of the measuring mark 137.

In the comparing unit 228, if the position of the seal line 150 detected by the position detecting unit 224 and the width of the seal line 150 measured by the width measuring unit 225 are not coincident with the predetermined position and width, the detected position and the measured width of the seal line 150 are compared with the predetermined position and width of the seal line 150.

The judging unit 229 judges the good and bad qualities of the seal line 150 based on the compared result by the comparing unit 228. In detail, if the error range of the position and the width for the seal line 150 is within the limitation value, the judging unit 229 judges that the seal line 150 is the good quality since the liquid crystal layer is not contaminated by contact with the seal line 150 or the sealing of the liquid crystal layer is not faulty. If the errors rang of the position and the width for the seal line 150 is exceed the limitation value, further, the judging unit 229 judges that the seal line 150 is the bad quality.

The display unit 226 displays the measured position and width of the seal line 150, the difference value of the position and the width between the predetermined value and the measured seal line 150, and the judgment of good and bad qualities.

Since the seal line 150 is made of the transparent sealant and the measuring marks 137 are made of the opaque metal, there is the difference value of the data, for example a luminous intensity, between the obtained images of the seal line 150 and the measuring mark 137 when the seal line 150 and the measuring mark 137 is photographed by the camera 210. The image analysis unit 222 recognizes the seal line 150 and the measuring marks 137 by the difference value of the data.

In the position detecting unit 224, the position of the seal line 150 is detected by the image of the position measuring marks 137a of the plurality of measuring marks 137, which indicate the predetermined position, and the image of the seal line 150. In the width measuring unit 225, the number of the measuring marks 137 overlapped with the seal line 150 is detected, thereby the width of the seal line 150 can be measured.

Figure 7:
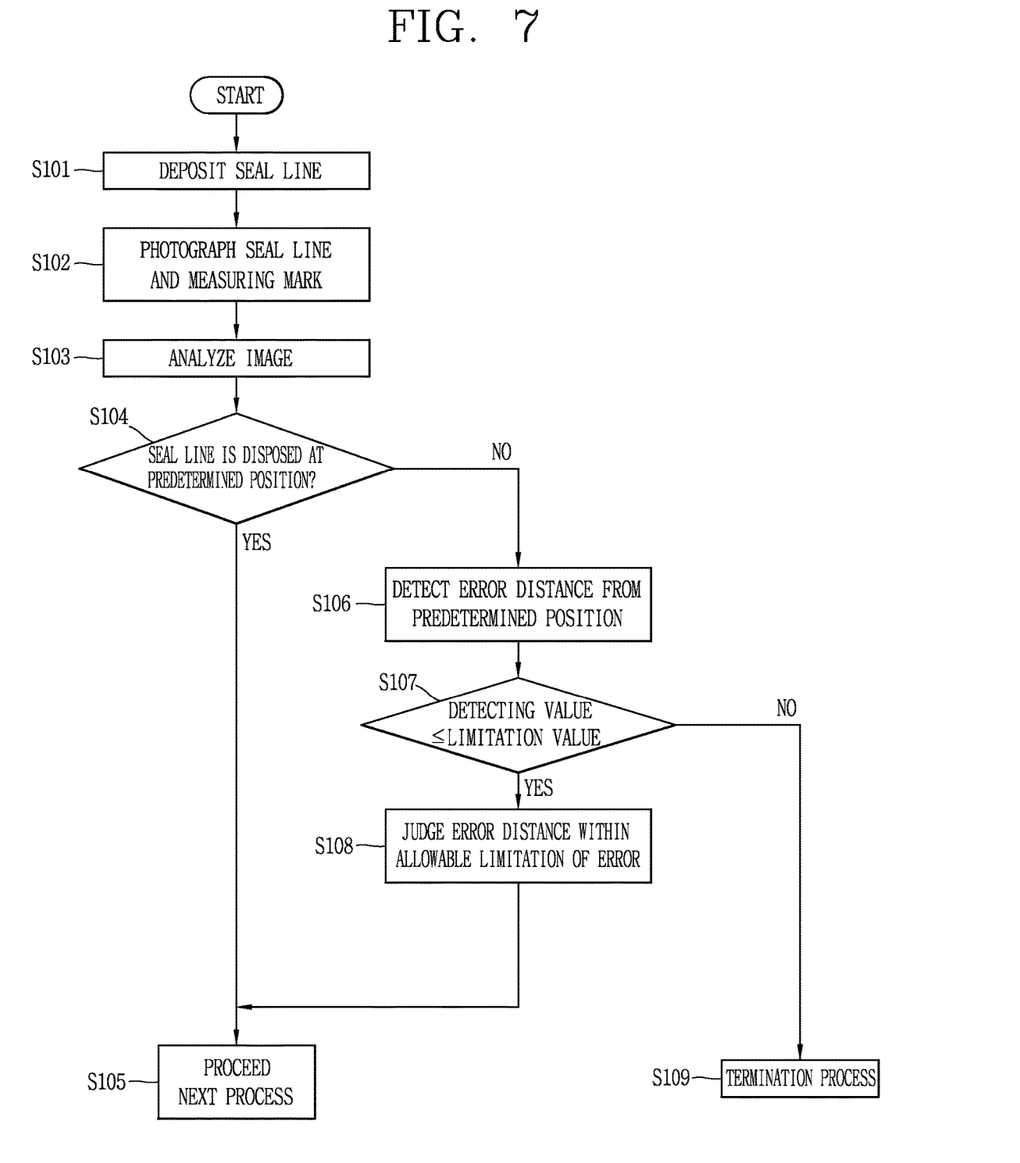
FIG. 7 is a flow chart illustrating a seal line measuring method of the liquid crystal display device according to an example embodiment of the present invention.

FIG. 7 is a flowchart illustrating the method of fabricating the liquid crystal display device according to an example embodiment of the present invention. For instance, this method may include a part of processes such as a seal line depositing process and a seal line detecting process. Hereinafter, we will describe the detecting method of the seal line 150 with the accompanying FIGS. 6 and 7 which illustrate respectively the structure of seal line inspection device and the sealing detection process.

As shown in FIG. 7, the sealant is firstly deposited in the dummy region along the outer portion of the first substrate 110 or/and the second substrates 140 to form the seal line 150 (S101). At this time, a thin film transistor and a metal pattern such as a gate pad and a data pad are disposed in each of the pixel regions on the first substrate 110, and the black matrix and the color filter layer are disposed over the second substrate 140. The plurality of the measuring marks 137 are disposed in the dummy region of the first substrate 110. In this case, the sealant is deposited by the various processes such as a screen printing process, a slit coating process, or a syringe coating process.

Thereafter, the seal line 150 and the measuring marks 137 in the dummy region are photographed by the camera to obtain the images thereof (S102) and then the obtained images are analyzed by the image analysis unit 222 of the controlling unit 220 (S103). At that time the seal line 150 and the measuring marks 137 are photographed during the sealant depositing process or the moment between the depositing process and the further process. In general, the liquid crystal display device is made by a series of fabrication processes. For instance, a dispensing process for dispensing the liquid crystal material and a substrates attaching process are proceeded after the sealant depositing process, these the sealant depositing process, the dispensing process of the liquid crystal material, and the substrates attaching process are proceeded within one continuous fabrication process. Since the photographing process of the sealing line 150 and the measuring marks 137 is achieved during the sealant depositing processes or at the moment between the sealant depositing process and the further process, the measuring process is achieved in real time of the fabrication process without the stop of the fabrication processes.

The image analysis unit 222 analyzes the image to recognize the position and the shape of the seal line 150 and the measuring marks 137. At this time, since the seal line 150 and the measuring mark 137 are made of the different material for each other, the image data of the seal line 150 and the measuring marks 137 has also the different values, so that the image analysis unit 222 recognizes the respective positions of the seal line 150 and the measuring marks 137 based on the different values of the image data.

Thereafter, the position of the seal line 150 is detected by the analyzed images of the seal line 150 and the measuring marks 137 to judge whether the seal line 150 is disposed at the predetermined position (S104).

That is, when the boundary of the seal line 150 is coincided with the position measuring marks 137a by the analyzed image, the position detecting unit 224 judges that the seal line 150 is disposed at the predetermined position, and then the next fabrication processes such the liquid crystal layer process and the attaching process of the first and second substrates 110 and 140 are proceeded (S105).

When the boundary of the seal line 150 is not coincided with the position measuring marks 137a by the analyzed image, the comparing unit 228 judges that the seal line 150 is not disposed at the predetermined position and detects the distance of the detected position of the seal line from the predetermined position by comparing the detected position of the seal line 150 with the predetermined position of the seal line 150 (S106).

Since the measuring marks 137 are disposed in the predetermined width (e.g., 3.5 μm) and the predetermined distance interval (e.g., 5 μm), the distance between the detected position and the predetermined position of the seal line 150 can be measured by detecting the number of the measuring marks 137 disposed between the boundary of the seal line 150 and the position measuring mark 137a.

Further, the width measuring unit 225 detects the number of the measuring marks 137 overlapped with the seal line 150 to measure precisely the practical width of the seal line 150.

Thereafter, if the distance between the detected position and the predetermined position of the seal line 150 is smaller than the limitation value by comparison of the comparing unit 228 (S107), the judging unit 229 judges that the distance error lies in range in the allowable limitation of error capable of attaching the first and second substrates and sealing the liquid crystal layer and then the next processes are proceeded (S108), although the seal line 150 is not disposed in the precise position and width.

At this time, the limitation value may be calculated in accordance with the various characteristics such as the area, the weight, the cell gap, the material of the seal line, and the area of the dummy region of the liquid crystal display device.

If the distance between the detected position and the predetermined position of the seal line 150 exceeds the limitation value by comparison of the comparing unit 228 (S107), the judging unit 229 judges the bad quality of the seal line 150 and then terminated the fabrication process without the next processes (S109).

As described above, the position and the width of the seal line can be measured during the fabrication process by forming the plurality of the measuring marks in the dummy region. The width of the seal line is estimated by measuring amount of the sealant deposited on the substrate in the related art, but the position and the width of the seal line are measured in real time of the fabrication process by the measuring means such as the measuring marks at the outer portion of the display region and the detection means of detecting the measuring means, such as the camera.

Therefore, when the seal line is bad quality, since the further processes are not proceeded, the vain cost and effort can be minimized. Further, since the camera is used to detect the position and the width of the seal line, the seal line can be rapidly and precisely inspected so that the reliability and the efficient of the processes can be improved.

Meanwhile, the foregoing description has been given of the liquid crystal display device in a specific structure, but the present invention is not be limited to them. Since the technical feature of this invention is the measuring marks in the dummy region where the seal line is disposed, this invention can be adapted to the every liquid crystal display device having the seal line disposed in the dummy region. For instance, although only the IPS (In Plane Switching) mode liquid crystal display device is described in the detail description of the invention, the liquid crystal display device having various mode such a Twisted Nematic mode, a Vertical Mode can be adapted in this invention.

It will be apparent to those skilled in the art that various modifications and variations can be made in the present invention without departing from the spirit or scope of the invention. Thus it is intended that the present invention cover the modifications and variations of this invention provided they come within the scope of the appended claims and their equivalents.

What is claimed is:
1. A liquid crystal display device, comprising:
   a first substrate including a display region and a non-display region around the display region;
   an opaque indicator including a pair of position measuring marks disposed above a gate link line and above a data link line on the first substrate in the non-display region to totally surround the display region; and
   a transparent sealant on the opaque indicator to seal the first substrate with a second substrate to sandwich a liquid crystal layer between the first substrate and the second substrate,
   wherein the pair of position measuring marks are visually verifiable to allow application of the transparent sealant along the opaque indicator at a predetermined width corresponding to a distance between the pair of position measuring marks,
   wherein each of the pair of position measuring marks is formed in a stripe shape having cross-shaped extensions at both sides thereof.
2. The liquid crystal display device of claim 1, wherein the opaque indicator is disposed on a passivation layer above the gate link line and the data link line in the non-display region.
3. The liquid crystal display device of claim 2, wherein the passivation layer provides planarization by having a predetermined thickness.
4. The liquid crystal display device of claim 2, wherein the passivation layer comprises a plurality of layers including an organic layer and an inorganic layer.
5. The liquid crystal display device of claim 1, further comprising a plurality of measuring marks including the pair of position measuring marks, wherein a distance between two neighboring measuring marks among the plurality of measuring marks is about 4.5 to 5.5 μm.

6. The liquid crystal display device of claim 1, wherein the opaque indicator includes at least one of a metal pattern, an insulating pattern, and a semiconductor pattern.

7. A liquid crystal display device, comprising:
a first substrate including a display region and a dummy region;
a passivation layer over the first substrate;
a plurality of measuring marks formed in a stripe shape disposed on the passivation layer in the dummy region to totally surround the display region; and
a seal line made of a transparent sealant overlapping with at least some of the measuring marks,
wherein the passivation layer is above a gate link line and a data link line in the dummy region of the first substrate,
wherein the measuring marks include a pair of position measuring marks spaced apart by a distance corresponding to a predetermined width of the seal line, and
wherein each of the pair of position measuring marks has cross-shaped extensions at both sides.

8. The liquid crystal display device of claim 7, wherein a width of each of the measuring marks is about 3.0 to 4.0 μm.

9. The liquid crystal display device of claim 7, wherein the measuring marks are arranged along a width direction of the seal line at regular distance intervals.

10. The liquid crystal display device of claim 9, wherein a distance interval between neighboring measuring marks is about 4.5 to 5.5 μm.

11. The liquid crystal display device of claim 7, wherein one or more of the measuring marks are located near a respective side end of the seal line.

12. The liquid crystal display device of claim 7, wherein each of the measuring marks includes at least one among a metal pattern, an insulating pattern, and a semiconductor pattern.

13. The liquid crystal display device of claim 7, wherein the measuring marks are located only at areas near edges of both sides of the seal line.

14. The liquid crystal display device of claim 7, wherein a distance of the seal line from a predetermined position of the seal line is indicated by a number of the measuring marks between one side end portion of the seal line and one of the pair of position measuring marks closer to the one side end portion of the seal line.

* * * * *